United States Patent

[11] 3,598,334

| [72] | Inventor | Oscar Fleischer<br>2610 S.W. 21st St., Miami, Fla. 33145 |
|---|---|---|
| [21] | Appl. No. | 4,216 |
| [22] | Filed | Jan. 20, 1970 |
| [45] | Patented | Aug. 10, 1971 |

[54] LEVEL WIND GUIDE ATTACHMENT FOR FISHING REELS
6 Claims, 6 Drawing Figs.

[52] U.S. Cl. .................................................. 242/84.41, 242/158
[51] Int. Cl. .................................................. A01k 89/04
[50] Field of Search .......................................... 242/84.41, 84.4, 84.43, 84.1

[56] References Cited
UNITED STATES PATENTS

| 368,922 | 8/1887 | Jarvis | 242/84.41 |
| 1,043,397 | 11/1912 | Capell | 242/84.43 |
| 1,575,619 | 3/1926 | Catucci | 242/81.1 K |
| 2,583,087 | 1/1952 | Cloud et al. | 242/158 UX |

*Primary Examiner*—Billy S. Taylor
*Attorney*—Salvatore G. Militana

ABSTRACT: A level wind guide attachment for fishing reels having a support adapted to be pivotally secured between the end housings of he fishing reel with a gear housing mounted on the support. Within the housing are a gear and a worm gear in mesh engagement with each other, the worm gear being mounted on a shaft that extends beyond the housing and having a spring-loaded friction wheel mounted thereon. The friction wheel is adapted to engage and rotate with one of the flanges of the line-receiving spool which causes the rotation of the gear and an arm attached thereto at whose end is swiveled eyelet through which the fishing line extends and upon the revolving of the arm during the winding action of the fishing line, the latter is placed evenly on the spool.

PATENTED AUG 10 1971 3,598,334
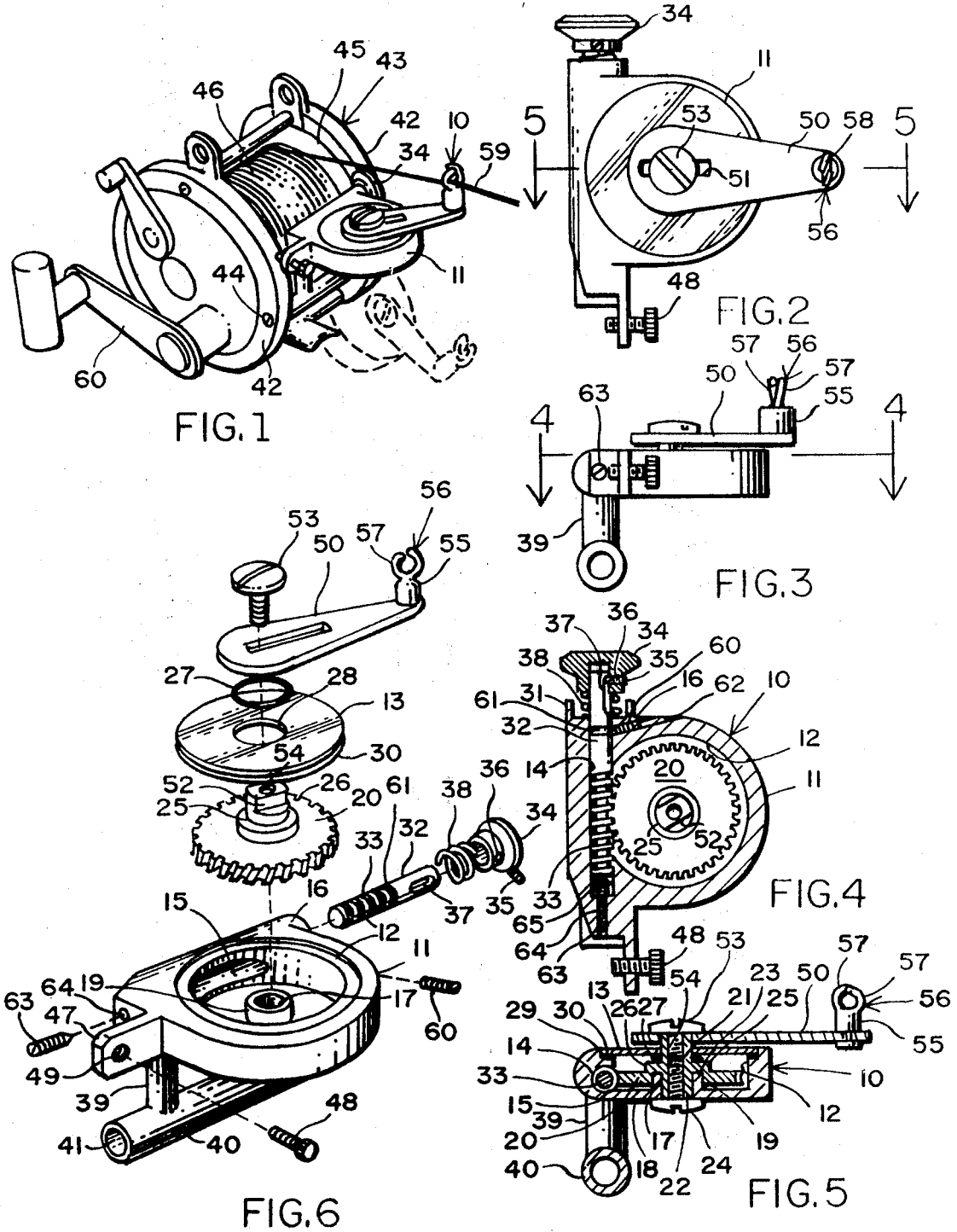
INVENTOR
OSCAR FLEISCHER
BY
Salvatore G. Militara
ATTORNEY 3,598,334

LEVEL WIND GUIDE ATTACHMENT FOR FISHING REELS

This invention relates to fishing equipment and is more particularly directed to a level wind guide attachment for fishing reels.

A principal object of the present invention is to provide a completely enclosed watertight attachment for fishing reels that permits the level winding of the fishing line on the reel whereby no water, salt, grime and other foreign matter can get into the operating mechanism thereof.

Another object of the present invention is to provide a level wind guide attachment for fishing reels that is not connected directly to the reel-operating mechanism as by gears and the like whereby the attachment is readily installed on any conventional reel by the ordinary fisherman.

A further object of the present invention is to provide a level wind guide for fishing reels that is pivotally mounted on the reel and operated by frictional engagement with the spool flange thereby being readily disengaged when casting and as readily engaged when rotating the spool for winding the fishing line back onto the spool.

A still further object of the present invention is to provide a level wind attachment guide for fishing reels that is simple to manufacture, readily mounted on a conventional fishing reel and adjustable to fit various size fishing reels.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

IN THE DRAWING

FIG. 1 is a perspective view of a fishing reel having a level wind guide attachment constructed in accordance with my invention.

FIG. 2 is a top plan view of the attachment as seen removed from the fishing reel.

FIG. 3 is a side elevational view.

FIG. 4 is a cross-sectional view taken along the line 4-4 of FIG. 3.

FIG. 5 is a cross-sectional view taken along the line 5-5 of FIG. 2.

FIG. 6 is an exploded view thereof.

Referring to the drawing wherein like numerals are used to designate similar parts throughout the several views, the numeral 10 refers to my attachment for fishing reels that effects the winding of the fishing line in a level and regular manner and consists of a body portion 11 having an open chamber 12 enclosed by a cover 13.

Communicating as at 15 with the chamber 12 is a bore 14 which extends transversely of the body portion 11 to an edge portion 16 of the body portion 11 where there is an axially disposed sleeve 31 mounted thereon.

There is a bore 17 in the central portion of the base member 18 of the body portion 11 having a cylindrical sleeve portion 19 extending above the floor of the base member 18.

Rotatably mounted in the body portion 11 is a gear 20 having a threaded bore 21. The gear 20 is provided with an axially disposed sleeve 22 that extends below the lower surface of the gear 20 with a peripheral slot 23 formed between the sleeve 22 and the lower surface of the gear 20 as best shown by FIG. 5. When the gear 20 is positioned in the chamber 12, the sleeve 19 of the base member 18 is received by the slot 23 of the gear 20 while the sleeve 22 of the gear 20 will extend along the bore 18 to a position slightly beyond the lower surface of the base member 18 so that when a bolt 24 is threaded into the bore 21 of the gear 20, the gear 20 will be secured in the chamber 12 and will rotate freely of the body member 11.

The gear 20 is provided with a hub portion 25 that is stepped as at 26 for receiving an O-ring 27 that is engaged at the inner periphery 28 of the cover 13 whose outer periphery is received on a ledge 29 formed about the chamber 12 with a gasket 30 placed between the cover 13 and ledge portion 29 to render the chamber 12 watertight.

Positioned in the bore 14 is a shaft 32 having a worm gear 33 in mesh engagement with the gear 20. The shaft 32 that extends beyond the sleeve 31 is provided with a friction wheel 34 that rotates in unison with the shaft 32 and is maintained in the bore 14 by a setscrew 60 threaded in a bore 62 and received by a peripheral slot 61 in the shaft 32. A setscrew 35 threaded in a bore 36 formed at the base of the friction wheel 34 is received in an elongated shallow slot 37 formed longitudinally of the shaft 32. A coil spring 38 is positioned about the shaft 32 within the sleeve 31 and extends between the friction wheel 34 and the edge portion 16 of the body member 11. This structure permits the adjustment of the friction wheel 34 for fishing reels of various sizes as is explained in detail hereinafter. An adjustable thrust bearing is effected by a pointed screwbolt 63 threaded in the bore 64 and engaging the end of the shaft 32.

To the base member 18 of the attachment 10 a pair of leg portions 39 extend downwardly to a cylindrical crossmember 40 that is provided by a threaded bore 41. The crossmember extends between the end casings 42 of a reel 43 and fastened thereto by bolts 44 that extend through plain bores in the end casing 42 and received by the threaded bores 41 of the crossmember 40. The level wind guide attachment 10 is thereby able to be swung from its operating position as shown by the solid lies in FIG. 1 to the dotted line position.

In order to maintain the friction wheel in proper frictional engagement with a flange 45 of the spool 46, a tab 47 is mounted on the body member 11 extending beyond the position of the end casing 42. An adjusting screw 48 which is threaded in a bore 49 engages the end casing 42 to permit the attachment 10 to swing to the proper position wherein the friction wheel 34 engages the flange 45 of the spool 46 without binding or slippage therebetween. Also, the friction wheel 34 is capable of sliding laterally on the shaft 32, a distance as determined by the length of the longitudinal slot 37 in order to adjust to various-sized spools 46.

Mounted to rotate with the gear 20 is a level-line winding arm 50 provided with an elongated rectangular slot 51 that receives the slotted end 52 of the gear hub 25. The arm 50 is adjustably fastened to the gear 20 by a screw 53 that is threaded into a threaded bore 54 in the hub 25. At the free end of the arm 50 is an upright swivel 55 having a split eyelet 56 mounted thereon. The ends of the arcuate arms 57 of the eyelet 56 are positioned in overlapping and spaced relation with each other to form a slot 58 to permit inserting the fishing line 59 therein without the necessity of cutting the fishing line to insert it into the eyelet. Since the arm 50 is adjustable on the hub 25 by merely loosening the screw 53 and sliding the arm 50 along its slot 51, my attachment 10 may be readily used on reels of different-sized spools.

It is readily noted that I have provided a level wind attachment 10 for fishing reels that may be readily mounted on fishing reels of various sizes easily and quickly. All that need be done is drill a hole in each of the end casings 42 and place the crossmember 40 therebetween. If the latter is too long, it may be readily shortened; or if too short, spacer members may be placed at the ends thereof. The screws 44 are then inserted into the bores in the end casings 42 and threaded into the threaded bores 41 of the crossmembers 40 to secure the attachment 10 to the reel 43 and permit the reel 43 to swing in and out of operating position as shown by FIG. 1. With the attachment 10 in the operating position as shown by the solid lines, the screw 48 is adjusted against the end casing 42 so that the friction wheel 34 engages the flange 45 of the spool 46 to effect the proper amount of friction to cause the friction wheel 34 to rotate in unison with the spool 46. Then the arm 50 is adjusted so that the diameter of the circle circumscribed by the arm 50 will be exactly equal to the distance between the flanges 45 of the spool 46. The fishing line 59 is then inserted in the slot 58 to be received by the eyelet 56. Now when the handle 60 is rotated to wind the fishing line 59 on the spool 46, the friction wheel 34 will rotate with the flanges 45 causing the worm gear 37 and gear 20 to rotate which in turn will rotate the arm 50 in a continuous circle. As the line 59 is being wound on the spool 46 it is being carried by the eyelet 56 on the rotating arm 50 and is consequently moving from side to side of the spool and causing the line to be placed on the spool 46 in a level and even position.

There are occasions as when casting that it is desirous to remove the fishing line 59 from the attachment 10 and position the latter so as not to interfere with the casting operation. In the use of my attachment 10, all that need be done is to slip the fishing line 59 through the slot 58 to remove the fishing line 59 from the eyelet 56. Then the attachment 10 is pivoted on the screwbolts 44 downwardly to the dotted line position as shown by FIG. 1 to permit a person to cast the fishing line 59 if it is his desire to cast free of the attachment 10. However, the attachment 10 permits casting with the line threaded through the eyelet 56. In this instance, all he need do is pivot the attachment 10 a slight distance which removes the friction wheel 34 out of engagement with the flanges 45 of the spool 46. As soon as the person wishes to wind the fishing line 59 back on the spool 46, he swings the attachment 10 back up to its solid line position wherein the friction wheel 34 engages the flanges 45. He then slides the line 59 in the slot 58 between the eyelet arms 57 and begins to actuate the handle 60 to wind the fishing line 59 on the spool 46.

What I claim as new and desire to secure by Letters Patent of the United States is:

1. A level wind guide attachment for fishing reels having a spool comprising a housing having a chamber, means mounted on said housing adapted to secure said attachment to a fishing reel transversely of said spool, gear means, pivot means rotatably mounting said gear means in said chamber, a second gear in mesh engagement with said gear means, a shaft secured to said second gear and extending outwardly of said housing, friction wheel means mounted on the free end portion of said shaft adapted to engage said spool of said fishing reel whereby upon rotation of said spool when winding fishing line on said spool, said gear is rotated in unison therewith, an elongated arm, means securing said elongated arm at one end to said pivot means, whereby said elongated arm rotates with said gear means and fishing line guide means rotatably mounted on the other end of said elongated arm for receiving and guiding said fishing line from side to side of said spool as said fishing line is wound on said spool.

2. The structure as recited by claim 1 wherein said housing having an open top portion, a cover having an opening mounted on said open top portion of said housing, seal means mounted between said cover and said housing, an O-ring mounted between said gear means and said cover adjacent said opening and said securing means of said elongated arm extending through said opening in said cover.

3. The structure as recited by claim 1 wherein said friction wheel being slidably mounted on said shaft, means limiting the sliding movement of said friction wheel and spring means yieldingly urging said friction wheel in the direction of said free end portion of said shaft.

4. The structure as recited by claim 3 wherein said elongated arm is provided with an elongated slot at said one end and said securing means is a bolt extending through said elongated slot whereby said elongated arm may be adjusted for spools of various widths.

5. The structure as recited by claim 4 wherein said rotatable fishing line guide means comprises a pair of arcuate arm portions terminating in overlapping and spaced relation whereby said fishing line guide may be threaded through the space between said arcuate arm portions.

6. The structure as recited by claim 1 wherein said attachment-securing means comprise a crossmember having bores at each end thereof and bolt means extending through said housing and received by said bores whereby said attachment may be pivoted to remove said friction wheel out of engagement with said spool and said attachment becoming inoperative.